(12) United States Patent
Chen et al.

(10) Patent No.: US 8,539,148 B1
(45) Date of Patent: Sep. 17, 2013

(54) DEDUPLICATION EFFICIENCY

(75) Inventors: Xiangping Chen, Shrewsbury, MA (US); Miles A. de Forest, Bahanma, NC (US); Joseph B. Shimkus, Framingham, MA (US); Philippe Armangau, Acton, MA (US); Mark Ku, Wollaston, MA (US)

(73) Assignee: EMC Corporation, Hopkinton, MA (US)

( * ) Notice: Subject to any disclaimer, the term of this patent is extended or adjusted under 35 U.S.C. 154(b) by 257 days.

(21) Appl. No.: 12/976,632

(22) Filed: Dec. 22, 2010

(51) Int. Cl.
*G06F 12/00* (2006.01)
(52) U.S. Cl.
USPC .......................................... 711/112

(58) Field of Classification Search
None
See application file for complete search history.

(56) References Cited

U.S. PATENT DOCUMENTS

| | | | | |
|---|---|---|---|---|
| 7,962,452 | B2 * | 6/2011 | Anglin | 707/645 |
| 8,140,821 | B1 * | 3/2012 | Raizen et al. | 711/202 |
| 8,161,255 | B2 * | 4/2012 | Anglin et al. | 711/162 |
| 8,250,325 | B2 * | 8/2012 | Holdman et al. | 711/162 |
| 8,266,102 | B2 * | 9/2012 | Akirav et al. | 707/613 |
| 2012/0151169 | A1 * | 6/2012 | Mori et al. | 711/166 |

* cited by examiner

*Primary Examiner* — Hiep Nguyen
(74) *Attorney, Agent, or Firm* — Krishnendu Gupta; Jason A. Reyes; Deepika Bhayana

(57) ABSTRACT

A method is used in improving deduplication efficiency. Metadata of a data object is evaluated for determining write activity of the data object. Based on the write activity, deduplicating technique is applied to the data object.

18 Claims, 7 Drawing Sheets

DEDUPLICATION EFFICIENCY

BACKGROUND

1. Technical Field

This application relates to improving deduplication efficiency.

2. Description of Related Art

Computer systems may include different resources used by one or more host processors. Resources and host processors in a computer system may be interconnected by one or more communication connections. These resources may include, for example, data storage devices such as those included in the data storage systems manufactured by EMC Corporation. These data storage systems may be coupled to one or more servers or host processors and provide storage services to each host processor. Multiple data storage systems from one or more different vendors may be connected and may provide common data storage for one or more host processors in a computer system.

A host processor may perform a variety of data processing tasks and operations using the data storage system. For example, a host processor may perform basic system I/O operations in connection with data requests, such as data read and write operations.

Host processor systems may store and retrieve data using a storage device containing a plurality of host interface units, disk drives, and disk interface units. The host systems access the storage device through a plurality of channels provided therewith. Host systems provide data and access control information through the channels to the storage device and the storage device provides data to the host systems also through the channels. The host systems do not address the disk drives of the storage device directly, but rather, access what appears to the host systems as a plurality of logical disk units. The logical disk units may or may not correspond to the actual disk drives. Allowing multiple host systems to access the single storage device unit allows the host systems to share data in the device. In order to facilitate sharing of the data on the device, additional software on the data storage systems may also be used.

SUMMARY OF THE INVENTION

A method is used in improving deduplication efficiency. Metadata of a data object is evaluated for determining write activity of the data object. Based on the write activity, deduplicating technique is applied to the data object.

BRIEF DESCRIPTION OF THE DRAWINGS

Features and advantages of the present invention will become more apparent from the following detailed description of exemplary embodiments thereof taken in conjunction with the accompanying drawings in which.

DETAILED DESCRIPTION OF EMBODIMENT(S)

Figure 1:
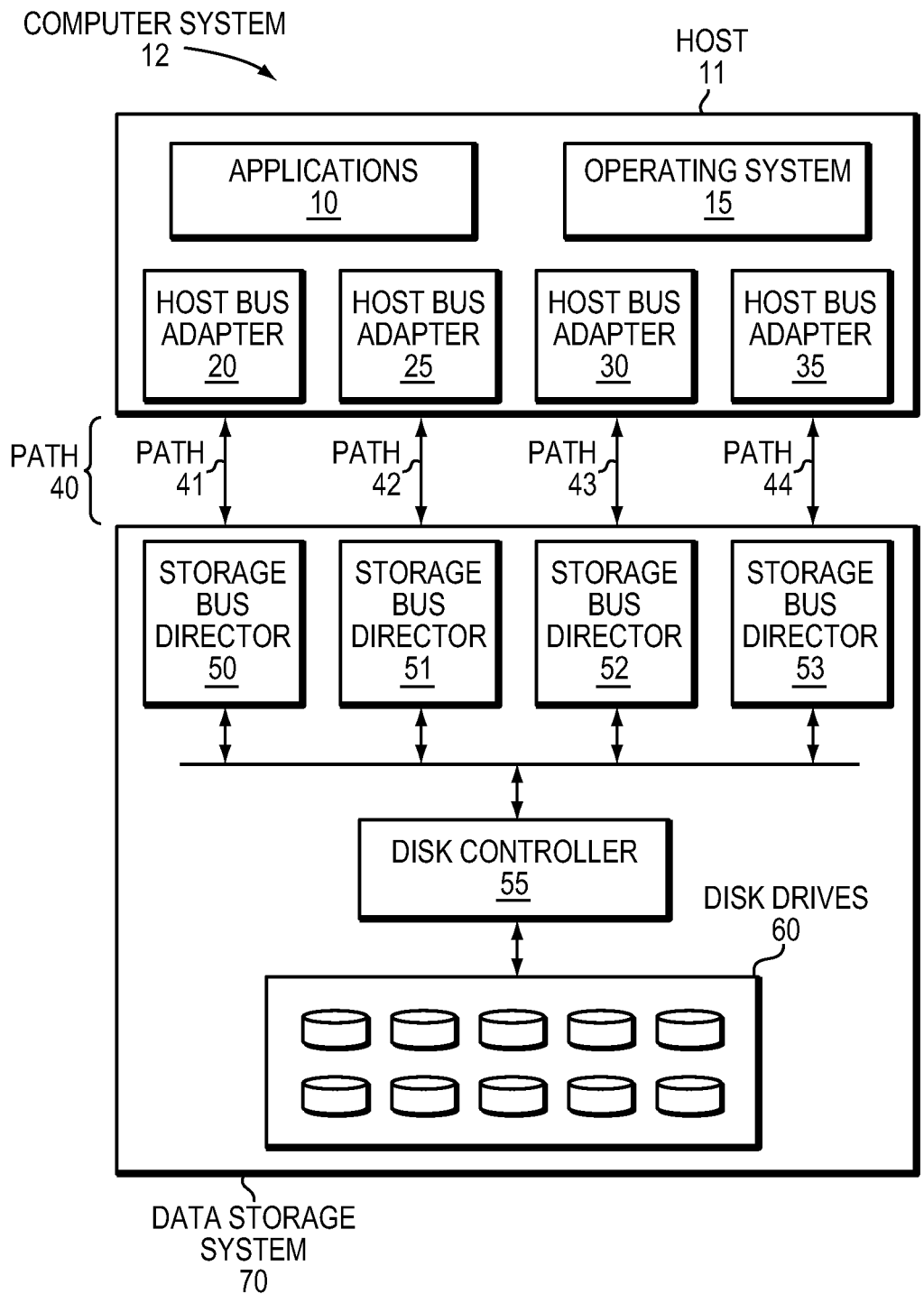
FIG. 1 is an example of an embodiment of a computer system that may utilize the techniques described herein.

Described below is a technique for use in improving deduplication efficiency (i.e., data deduplication), which technique may be used to provide, among other things, applying a deduplicating technique on a data object based on write activity of the data object. Data deduplication is a process by which a data storage system can detect multiple identical copies of data and only keeps a single copy of that data, thus eliminating the redundant data by removing other copies of that data and thus improving storage utilization. In at least some systems, data deduplication requires iterating over set of data blocks in one or more storage extents, finding the blocks that contain identical information by processing digest information associated with each block and mapping the identical blocks to a single copy of the data. In such systems, an index table of unique digests is created to find commonality among the data set.

When a deduplicated data block is updated with a new content, a new data block is created containing the new updated content. Mapping of the deduplicated block is then changed to point to the new data block and the deduplicated block no longer points to the single copy of the data. This process is also referred to as reduplication. Depending upon write activity of a data object (e.g. data block is updated frequently), the process of data reduplication may create many stale digest entries for the same data block in the index table. These stale digest entries increase size of the index table. A large index table consumes more storage resources and memory of the storage system. Further, many stale digest entries in the index table cause performance degradation. Therefore, given a limited amount of memory and/or storage resources, not every block of the storage system can be selected and information for that block stored in an index table. A goal is to avoid selecting blocks that have a high probability of being reduplicated and reduce the incidence of stale digest entries in the index table using the least or a reduced amount of time, memory, and storage resources.

In at least one storage system implementation as described below, improving deduplication efficiency includes skipping data blocks for data deduplication processing based on write activity of data blocks, such that data blocks that have a high probability of being reduplicated are not selected for deduplication and digest entries are not created for such blocks in the index table.

Conventionally, data deduplication for feature software requires that data blocks in a storage extent be iterated from beginning to end. A set of storage extents that are deduplicated together form a deduplication domain. As a result, in a conventional system, every data block of each storage extent in the deduplication domain is iterated through according to a specific iteration scheme. During this process, an index table of unique digests is created from the blocks that are iterated through. Additionally, in many conventional cases, when a data block is deduplicated, the data block is marked as "digested" and is excluded from future iterations. Conventionally, in such a case, when the contents of the deduplicated data block are overwritten or modified, the deduplicated data block is marked as "not digested" and the deduplicated data block once again becomes a candidate for deduplication during future iterations of the storage extent containing the deduplicated data block. Thus, conventionally in such a case, when contents of the data block are updated frequently, each iteration of the data block creates a digest entry in the index table, in turn, increasing the size of the index table. A large index table in such conventional system consumes a large amount of storage resources. Further, iterating over the large index table takes more time, thus increasing the possibility that by the time possible duplicate data is found, the original data may have become stale or changed. Therefore, in such a conventional system, the time required to find a matching digest for data deduplication increases with the number of times the contents of data blocks are changing.

By contrast, in at least some implementations in accordance with the technique as described herein, the use of the improving deduplication technique can provide one or more of the following advantages: lowering costs by improving deduplication efficiency, improving memory utilization by reducing the index table size, improving deduplication performance by allocating CPU cycles to data blocks that are better suited for deduplication, minimizing overhead for deduplication processing by iterating through data blocks that have stable content and reducing the amount of storage required for data deduplication by identifying and skipping data blocks for deduplication processing based on write activity of data blocks.

In some embodiments, the current technique can be used to improve deduplication efficiency in a case in which a storage extent includes data blocks containing file system metadata. Typically, metadata is data that provides information about one or more attributes of a file system. File system metadata is frequently overwritten and duplicated in order to provide fault tolerance in a system by storing more than one copy of the file system metadata. Deduplicating identical copies of the file system metadata defeats the purpose of fault tolerance by maintaining a single copy of metadata. Thus, deduplicating file system metadata destroys the ability to retrieve a duplicate copy of the metadata in case a primary copy of the metadata is corrupted and is inaccessible. Similarly, the current technique can be used to improve deduplication efficiency in a case in which a storage extent includes data blocks containing database transaction logs. A database transaction log is constantly overwritten because the log maintains a history of transactions performed on a database. Thus, the contents of data blocks containing the database transaction log change every time a transaction is performed on the database. Thus, typically, there is little chance of finding data blocks that are candidates for deduplication in a case where data blocks contain the database transaction log. Further, the current technique can also be used to improve deduplication efficiency in a case in which a storage extent includes data blocks containing new email data. Typically, old emails are seldom modified and a user receives new emails more often than the user modifies old emails. Thus, there is little chance of finding data blocks that are candidate for deduplication in a case where data blocks contain new email data. In all the above mentioned cases, identifying data blocks based on write activity of data blocks allows the system to give priority to deduplicating data blocks that are stable and that do not change often.

Referring to FIG. 1, shown is an example of an embodiment of a computer system that may be used in connection with performing the techniques described herein. A computer system may include multiple hosts and multiple data storage systems in such a way that each host may access data on each of data storage systems. For simplicity, however, FIG. 1 illustrates a computer system 12 that includes a single host 11 and a single data storage system 70. Applications 10 running on operating system 15 of host 11 may access data in data storage system 70 via I/O driver and host bus adapters 20, 25, 30, and 35. Host 11 can be, for example, a server, a personal computer, or any other devices capable of initiating read and write requests to data storage system 70. Data storage system 70 can be a single physical data storage device or a data storage system comprising multiple physical data storage devices including an enterprise storage system. In computer system, consistent with the principles of the invention, there may be a plurality of data storage systems 70 accessible by host 11 and each data storage system may be unique.

Host 11 has multiple paths 40 for sending I/O requests to data storage system 70. Typically, there are at least two paths from a host to a data storage system. FIG. 1 shows four paths from host 11 to data storage system 70: path 41, path 42, path 43, and path 44. Each of the paths 40 can be any of a number of different types of communication links that allow data to be passed between data storage system 70 and host 11. Each of the host bus adapters 20, 25, 30, and 35 would be adapted to communicate using an appropriate protocol via the paths 40 with the storage bus directors 50, 51, 52 and 53. For example, path 40 can be implemented as a SCSI bus with host bus adapters 20 and storage bus director 50 each being a SCSI driver. Alternatively, path 40 between the host 11 and the data storage subsystem 70 may be a Fibre Channel fabric. Moreover, a path 40 may include multiple communication path types and may be part of a communication network.

In this embodiment of the computer system 12, the host 11 may access the data storage systems 70, for example, in performing input/output (I/O) operations, data requests, and other operations. The host 11 may perform different types of data operations in accordance with different types of tasks. The communication medium, path 40, may be any one or more of a variety of networks or other type of communication connections as known to those skilled in the art. Each of the paths 41-44 may be a network connection, bus, and/or other type of data link, such as a hardwire or other connections known in the art. The processors included in the host computer systems 11 may be any one of a variety of proprietary or commercially available single or multi-processor system, such as an Intel-based processor, or other type of commercially available processor able to support traffic in accordance with each particular embodiment and application.

It should be noted that the particular examples of the hardware and software that may be included in the data storage system 70 are described herein in more detail, and may vary with each particular embodiment. The host 11 and data storage system 70 may all be located at the same physical site, or, alternatively, may also be located in different physical locations.

Storage bus directors 50, 51, 52 and 53 further communicates with the disk controller 55 to access data stored on the disk drives 60. The disk controller 55 may be configured to perform data storage operations on behalf of the host 11. Host system 11 may not address the disk drives of the storage systems directly, but rather access to data may be provided to one or more host systems from what the host systems view as a plurality of logical devices or logical volumes (LVs). The LVs may or may not correspond to the actual disk drives. For example, one or more LVs may reside on a single physical disk drive. Data in a single data storage system may be accessed by multiple hosts allowing the hosts to share the data residing therein. An LV or LUN (logical unit number) may be used to refer to the foregoing logically defined devices or volumes.

Figure 2:
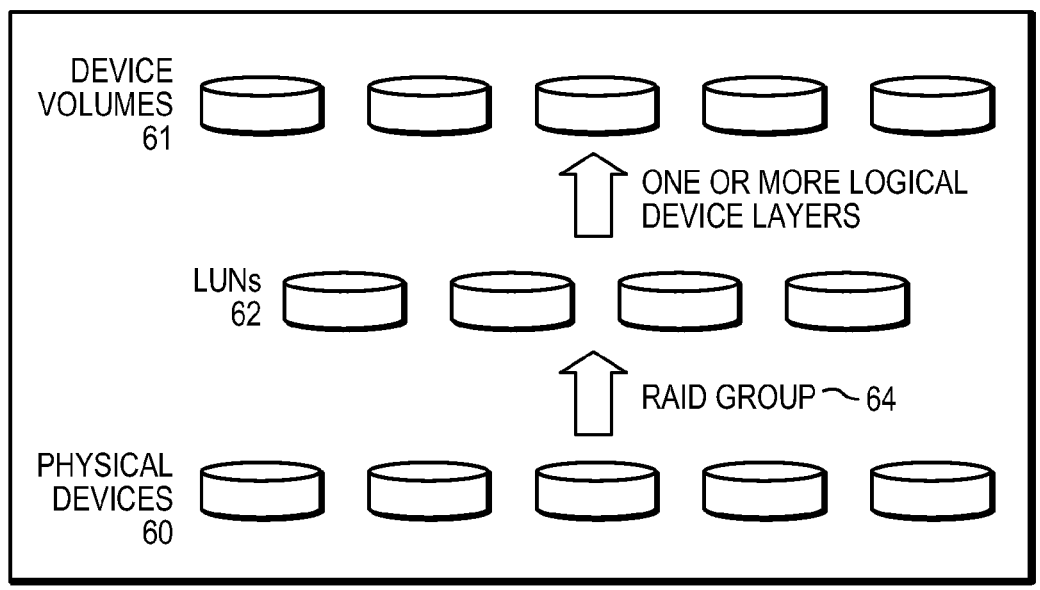
FIG. 2 is an example illustrating storage device layout.

FIG. 2 illustrates one of the many ways of constructing storage extents from a group of physical devices. For example, RAID Group 64 may be formed from physical disk devices 60. The data storage system best practices of a policy may specify the particular RAID level and configuration for the type of storage extent being formed. The RAID Group 64 may provide a number of data storage LUNs 62. An embodiment may also utilize one or more additional logical device layers on top of the LUNs 62 to form one or more logical device volumes 61. The particular additional logical device layers used, if any, may vary with the data storage system. It should be noted that there may not be a 1-1 correspondence between the LUNs of 62 and the volumes of 61. In a similar manner, device volumes 61 may be formed or configured from physical disk devices 60. Device volumes 61, LUNs 62 and physical disk devices 60 may be configured to store one or more blocks of data or one or more files organized as a file system. A storage extent may be formed or configured from one or more LUNs 62. Thus, a deduplication domain consisting of a set of storage extents includes a set of deduplicated LUNs sharing a common set of blocks.

In another embodiment, the data storage subsystem 70 may include one or more data storage systems such as one or more of the data storage systems offered by EMC Corporation of Hopkinton, Mass. The data storage system may also include one or more data storage devices, such as disks. One or more data storage subsystems may be manufactured by one or more different vendors. Each of the data storage systems may be inter-connected (not shown). Additionally, the data storage systems may also be connected to the host systems through any one or more communication connections that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 70. It should be noted that each of the data storage systems may operate stand-alone, or may also be included as part of a storage area network (SAN) that includes, for example, other components such as other data storage systems. Each of the data storage systems may include a plurality of disk devices or volumes. The particular data storage systems and examples as described herein for purposes of illustration should not be construed as a limitation. Other types of commercially available data storage systems, as well as processors and hardware controlling access to these particular devices, may also be included in an embodiment.

In such an embodiment in which element 70 of FIG. 1 is implemented using one or more data storage systems, each of the data storage systems may include code thereon for performing the techniques as described herein. In following paragraphs, reference may be made to a particular embodiment such as, for example, an embodiment in which element 70 of FIG. 1 includes a single data storage system, multiple data storage systems, a data storage system having multiple storage processors, and the like. However, it will be appreciated by those skilled in the art that this is for purposes of illustration and should not be construed as a limitation of the techniques herein.

As will be appreciated by those skilled in the art, the data storage system 70 may also include other components than as described for purposes of illustrating the techniques herein.

The embodiment of FIG. 1 benefits from iterating over various storage extents in accordance with the current technique in order to improve the performance of a data deduplication process within the embodiment. In particular, the data deduplication process may benefit from knowledge of write activity of data blocks being deduplicated. Write activity of a data block may indicate how frequently the data block has been modified. Write activity of a data block may also indicate how recently the data block has been modified. In at least some embodiments based on the current technique, data blocks that are frequently or recently modified may be skipped for deduplication processing in order to improve deduplication performance. Skipping a data block for deduplication processing may be based on evaluation of metadata of the data block. The metadata of the data block may include a timestamp indicating a time of recent write activity of the data block. The metadata of the data block may also include a counter indicating number of times the data block has been modified.

Figure 3:
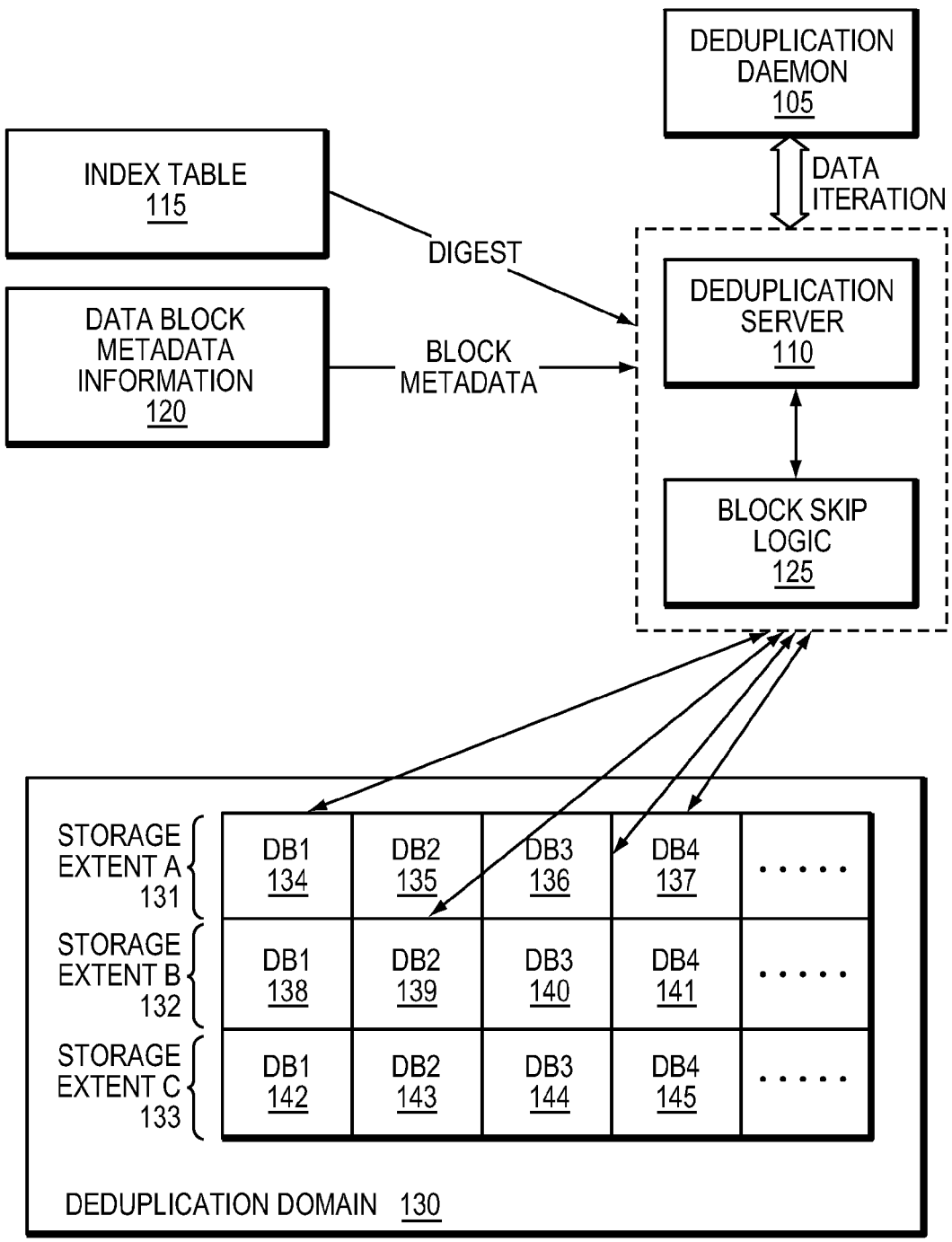
FIGS. 3 and 4 are diagrams illustrating in more detail components that may be used in connection with techniques herein.

Referring to FIG. 3, shown is a more detailed representation of components that may be included in an embodiment using the techniques herein. In a deduplication domain, each storage extent contains a range of data blocks. For example, in FIG. 3, storage extent A 131, storage extent B 132 and storage extent C 133 are part of the deduplication domain 130. Within a data storage system 70, there may be multiple deduplication domains. Within a deduplication domain, a goal of a deduplication process is to maintain only a single copy of each unique set of data. Software or other logic executing the deduplication process examines data in the deduplication domain in fixed sized chunks and determines whether the data stored in a chunk is the same as the data stored in another chunk in the same deduplication domain. If so, an address map for the LUNs is manipulated so that respective address map entries for the chunks reference the same physical chunk of data, and then the chunks that currently hold the extra copies of the data are freed up as unused storage. The address map for the LUNs stores a mapping of logical block addresses to physical block addresses. In at least some embodiments of the current technique, the fixed sized chunk can be a data block. For example, in FIG. 3, storage extent A 131 includes data blocks 134-137, storage extent B 132 includes data blocks 138-141 and storage extent C 131 includes data blocks 142-145 and other data blocks (not shown).

In at least one embodiment of the current technique, deduplication server 110 is a component that provides services to deduplication daemon 105 to iterate over sets of data in a deduplication domain 130. Deduplication server 110 also computes digests and remaps blocks after the deduplication technique is applied to remove duplicate blocks of data. Deduplication daemon 105 maintains a deduplication database (e.g. an index table) for a deduplication domain 130. Deduplication daemon 105 communicates with the deduplication server 110 to iterate through deduplication domain 130 and computes digests for the data blocks that are iterated through. A digest is created for each chunk of data that is iterated. Deduplication daemon 105 detects potential duplicate copies of data during the iteration and issues a request to the deduplication server 110 to deduplicate the data. The deduplication database is stored on one of the storage extents that includes one or more LUNs. Deduplication daemon 105 also maintains an index table 115 on a LUN located in the same pool as the deduplication domain 130. In at least some implementations, an index table is a persistent hash-table of chunk-IDs keyed by the digest of the data stored in the chunk. The index table need not contain entries for every data chunk in the deduplication domain, but the effectiveness of deduplication is a function of the number of entries stored in the index table 115. The more entries in the index table, the more likely that duplicate blocks will be detected during the iteration. To accommodate more entries, the index table requires more memory and storage resources. Additionally, if the amount of storage used by the user is in terabytes, it can take days to iterate over the chunks of data for such a large address space of the storage. Thus, the index table typically contains an incomplete set of entries and does not include digests for all of the data inside all of the storage in the deduplication domain. In at least one embodiment, use of the current technique enables skipping data blocks for deduplication processing based on the write activity of the data blocks, such that iteration occurs over a collection of data blocks within a set of storage extents that have a low probability of getting reduplicated. Deduplication server 110 interacts with block skip logic 125 to identify and skip a data block for deduplication processing during an iteration based on write activity of the data block. Block skip logic 125 evaluates write activity of the data block based on metadata of the data block 120. Metadata of a data block may include a timestamp indicating the time of the last modification made to the data block. The timestamp helps indicate whether the data block was recently modified. Additionally, the metadata of the data block may also include a generation count indicating the number of times the data block has been modified by a user or an application since the data block was first allocated to write data in the data block. The generation count helps indicate whether the data block has been modified frequently. Block skip logic 125 identifies data blocks that are frequently or recently modified based on evaluation of the metadata of data blocks. Deduplication server 110 then skip data blocks for deduplication that are identified by block skip logic 125.

It should be noted that block skip logic 125 may also be included as part of deduplication server 110. Further, it should be noted that block skip logic 125 may also be included as part of any other component in an embodiment.

Figure 4:
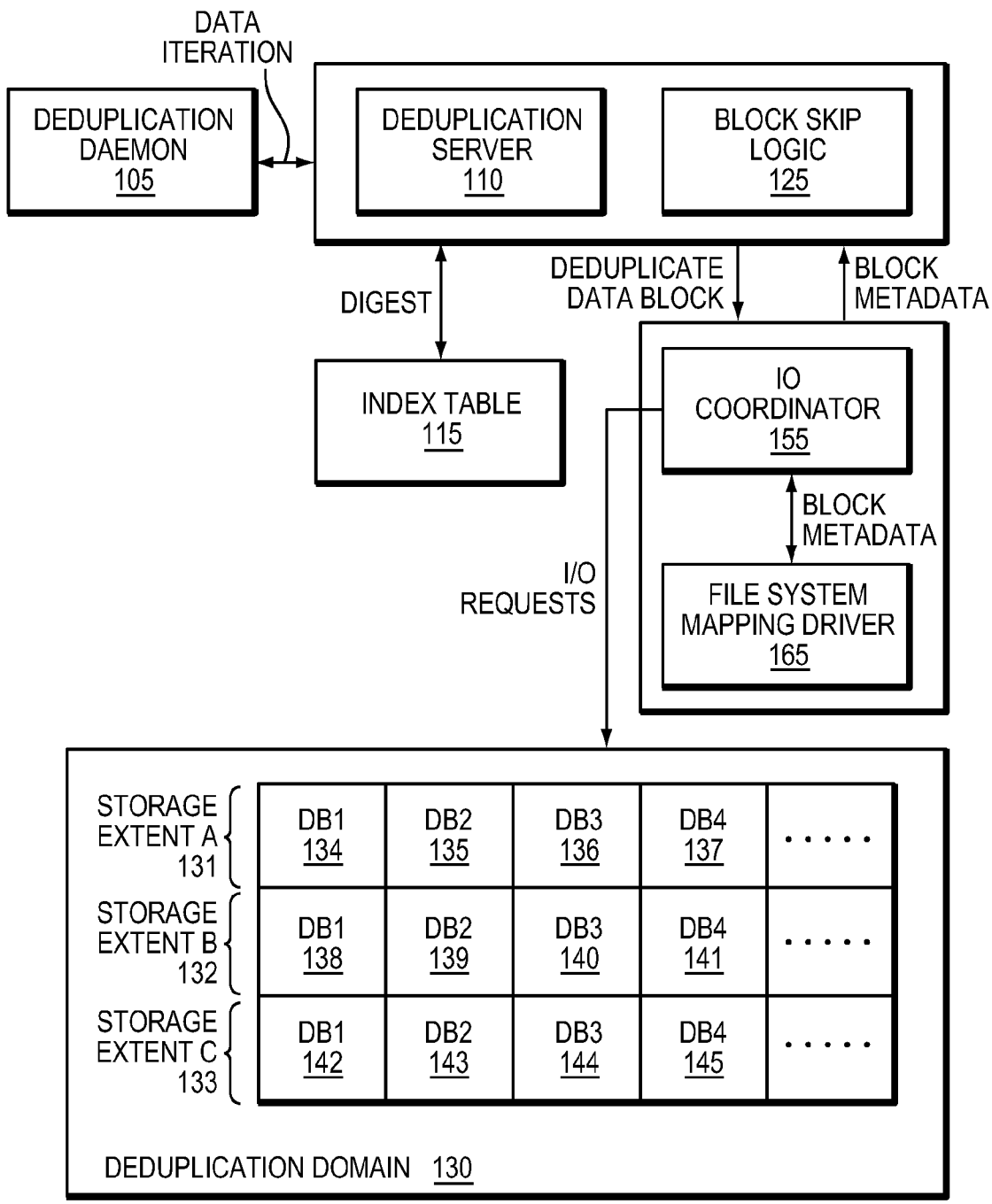

Referring to FIG. 4, shown is a more detailed representation of components that may be included in an embodiment using the techniques herein. During deduplication processing as described herein, deduplication server 110 provides services to deduplication daemon 105 by interacting with IO Coordinator 155 and File System Mapping Driver 165. Deduplication of data happens in two logically distinct operations: detection and remapping. The detection operation identifies blocks containing the same data. The remapping operation updates address maps that record physical locations of logical units of data so that a single block of data is shared by multiple LUNs or by multiple positions within the same LUN. Detection is accomplished by building a database (e.g., index table 115) that maintains a digest (e.g., SHA, checksum) for each block. When two blocks have the same digest they have a sufficiently high probability of containing the same data to warrant a bit-for-bit comparison to confirm they are exact duplicates. Remapping leverages dynamic block-mapping technology of filesystem mapping driver 165. A filesystem allows dynamic manipulation of the address maps that connects LUN's logical address space to its physical address space. The file system also allows mapping a single block of storage at multiple locations within the filesystem, and allows handling of writes to shared blocks by allocating new storage and updating the shared address mappings. Thus, file system mapping driver 165 maintains metadata of data blocks that is evaluated by block skip logic 125 to determine write activity of data blocks. IO Coordinator 155 manages I/O operations in conjunction with the file system mapping driver 165. IO Coordinator 155 provides framework for implementing digest and other I/O requests issued by the deduplication server 110.

Figure 5:
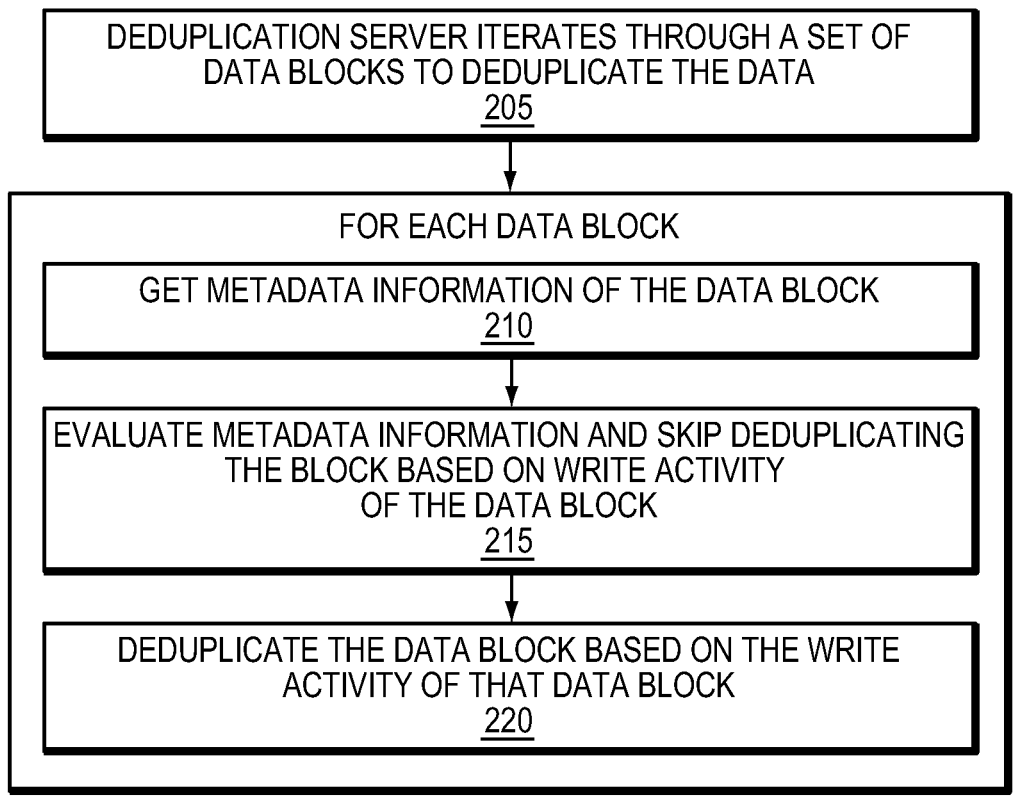
FIGS. 5-7 are flow diagrams illustrating processes that may be used in connection with techniques herein.

Referring to FIG. 5, shown is a flow diagram illustrating a flow of data in the data storage system. Deduplication server 110 iterates through a set of data blocks in a deduplication domain based on an iteration scheme in order to deduplicate the set of data blocks (step 205). For each data block that is part of the iteration scheme, metadata information of the data block is retrieved (step 210). Metadata information is evaluated to determine write activity of the data block in order to identify and skip the data block for deduplication processing (step 215). Deduplication server 110 deduplicates the data block based on write activity of the data block (step 220). In other words, deduplication server 110 deduplicates data blocks that are neither recently modified nor frequently modified. Further, deduplication server 110 skips data blocks for deduplication processing that are recently or frequently modified.

Figure 6:
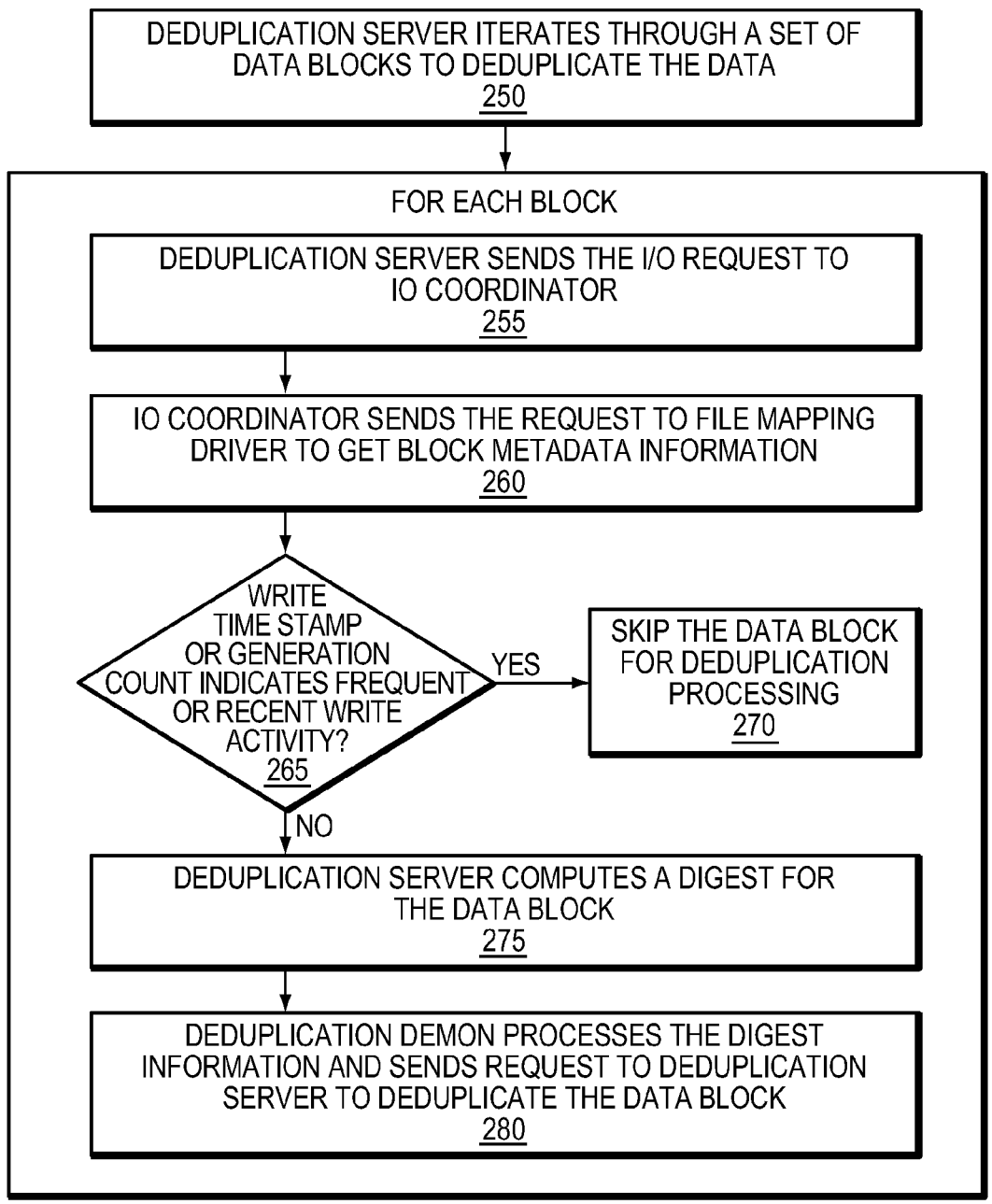

Referring to FIG. 6, shown is a more detailed flow diagram illustrating a flow of data in the data storage system. Deduplication server 110 iterates through a set of data blocks in a deduplication domain in order to deduplicate the set of data blocks (step 250). For each data block that is part of the iteration scheme, deduplication server 110 sends a request to IO coordinator 155 (step 255). IO coordinator sends a request to file mapping driver 165 to retrieve metadata information of the data block (step 260). Metadata information such as a timestamp value and/or a generation count are evaluated to determine write activity of the data block in order to skip the data block for deduplication processing (step 265). If write activity of the data block indicates that the data block was recently modified or the data block was frequently modified, the data block is skipped for deduplication and the iteration scheme then proceeds to process next data block (step 270). If write activity of the data block does not indicate that the data block was recently modified or the data block was frequently modified, deduplication server 110 computes a digest for the data block in order to deduplicate the data block (step 275). Deduplication server 110 sends the digest for the data block to deduplication daemon 105. Deduplication daemon 105 then compares the digest for the data block with list of digests stored in the index table. If a matching digest is found in the index table, deduplication daemon 105 sends a request to deduplication server 110 to deduplicate the data block (step 280).

Figure 7:
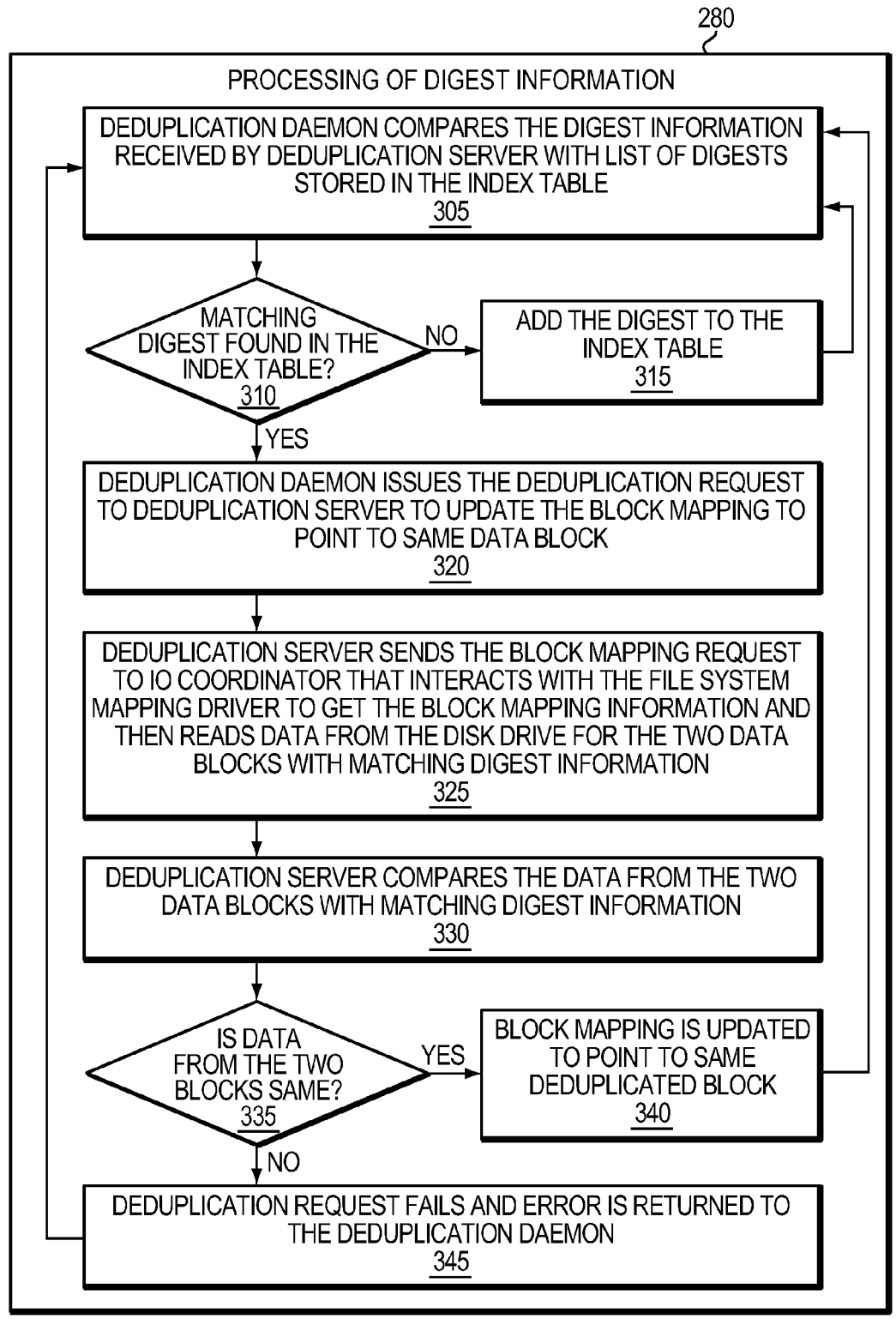

Referring now to FIG. 7 that illustrates a process of deduplicating two data blocks that have been identified by deduplication daemon 105 as duplicate data blocks during processing of a digest information. Deduplication daemon 105 compares the digest information of a first data block received from the deduplication server 110 with the list of digests stored in the index table (step 305). A matching digest found in the index table indicates that the first data block contains exact same data as data stored in a second data block corresponding to the matching digest (step 310). Deduplication daemon 105 issues a request to the deduplication server 110 to deduplicate the first data block and the second data block (step 320). Deduplication server 110 extracts filesystem information from the digest information of the first data block. Deduplication server 110 issues an I/O request to the IO Coordinator 155 (step 325). The IO Coordinator 155 issues a mapping request to the file system mapping driver 165 to find physical address of the first data block. If the mapping request completes successfully, the IO Coordinator 155 reads the data from the first data block located at the physical address indicated by the mapping. The deduplication server 110 issues a read request for the second data block. The read request for the second data block is processed identically to the first read request (step 330). When the second read request completes, deduplication server 110 compares the data read from the first data block with the data read from the second data block (step 335). If the data of the first data block is not same as the data of the second data block, the request to deduplicate the data blocks fails and an error is returned back to the deduplication daemon 105 (step 345). If the data of the first data block is same as the data of the second data block, the IO Coordinator 155 requests file system mapping driver 165 to deduplicate the two identical data blocks (step 340). If the data blocks are successfully deduplicated, the address mapping of the first data block is updated to point to a single copy of the data (i.e. the address map of the first data block now points to the address map of the second data block) (step 340). If the data blocks are not successfully deduplicated, an error is returned back to the deduplication daemon 105 to update its index table accordingly (step 345). If no matching digest is found in the index table, the digest of the data block is added to the index table (step 315).

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A method for use in improving deduplication efficiency, the method comprising:
   evaluating metadata of a data block for determining write activity of the data block, wherein determining write activity of the data block includes determining whether the data block has been recently modified, wherein the metadata of the data block is accessed using a file system mapping logic; and
   based on the write activity, skipping the data block for applying the deduplicating technique.

2. The method of claim 1, wherein determining the write activity of the data block further comprising:
   determining frequency of updates to the data block, wherein the frequency of updates is based on a counter indicating number of times the data block is updated.

3. The method of claim 1, wherein determining the write activity of the data block further comprising:
   determining time of last update to the data block.

4. The method of claim 1, wherein the data block is selected from the group consisting of a deduplication domain, a storage extent, a LUN, a file and a data block, wherein the data block is a fixed size chunk of a physical disk storage.

5. The method of claim 4, wherein the deduplication domain comprises a set of storage extents, wherein each storage extent of the set of storage extents comprises a set of LUNs, each LUN of the set of LUNs is a logical representation of a subset of a physical disk storage.

6. The method of claim 1, wherein a digest is associated with a data block, wherein the digest is based on contents of the data block and uniquely identifies the data block.

7. The method of claim 1, wherein an index table comprises a set of index entries, wherein each index entry of the set of index entries is associated with a digest of a data block.

8. The method of claim 1, wherein applying a deduplicating technique further comprising:
   computing a digest for a data block; and
   processing the digest for the data block.

9. The method of claim 8, wherein the processing of digest for the data block further comprising:
   comparing the digest with one or more index entries of the index table;
   determining, based on whether the digest matches with an index entry of the index table, whether to apply a deduplicating technique to the data block;
   based on the determination, comparing contents of a data block associated with the digest with contents of a data block associated with the matching index entry; and
   based on the comparison, applying the deduplicating technique to the data block associated with the digest and the data block associated with the matching index entry.

10. The method of claim 9, further comprising:
    based on whether the digest matches with an index entry of the index table, adding an index entry to the index table, wherein the index entry is associated with the digest.

11. The method of claim 1, wherein applying the deduplicating technique further comprising:
    updating an address mapping of a first data block to point to a second data block, wherein the first data block and the second data block contain same content of data, wherein the address mapping indicates a location of a data block on a disk storage; and
    deleting the content of the first data block from the disk storage.

12. A system for use in improving deduplication efficiency, the system comprising:
    first logic evaluating metadata of a data block for determining write activity of the data block, wherein determining write activity of the data block includes determining whether the data block has been recently modified, wherein the metadata of the data block is accessed using a file system mapping logic; and
    second logic skipping, based on the write activity, the data block for applying the deduplicating technique.

13. The system of claim 12, wherein determining the write activity of the data block further comprising:
    third logic determining frequency of updates to the data block, wherein the frequency of updates is based on a counter indicating number of times the data block is updated.

14. The system of claim 12, wherein determining the write activity of the data block further comprising:
    third logic determining time of last update to the data block.

15. The system of claim 12, wherein the data block is selected from the group consisting of a deduplication domain, a storage extent, a LUN, a file and a data block, wherein the data block is a fixed size chunk of a physical disk storage.

16. The system of claim 15, wherein the deduplication domain comprises a set of storage extents, wherein each storage extent of the set of storage extents comprises a set of LUNs, each LUN of the set of LUNs is a logical representation of a subset of a physical disk storage.

17. The system of claim 12, wherein a digest is associated with a data block, wherein the digest is based on contents of the data block and uniquely identifies the data block.

18. The system of claim 12, wherein applying a deduplicating technique further comprising:
    computing a digest for a data block; and
    processing the digest for the data block.

* * * * *